Jan. 1, 1946. I. M. COLBETH 2,392,119
PROCESS FOR DEHYDRATING OIL
Filed July 11, 1941
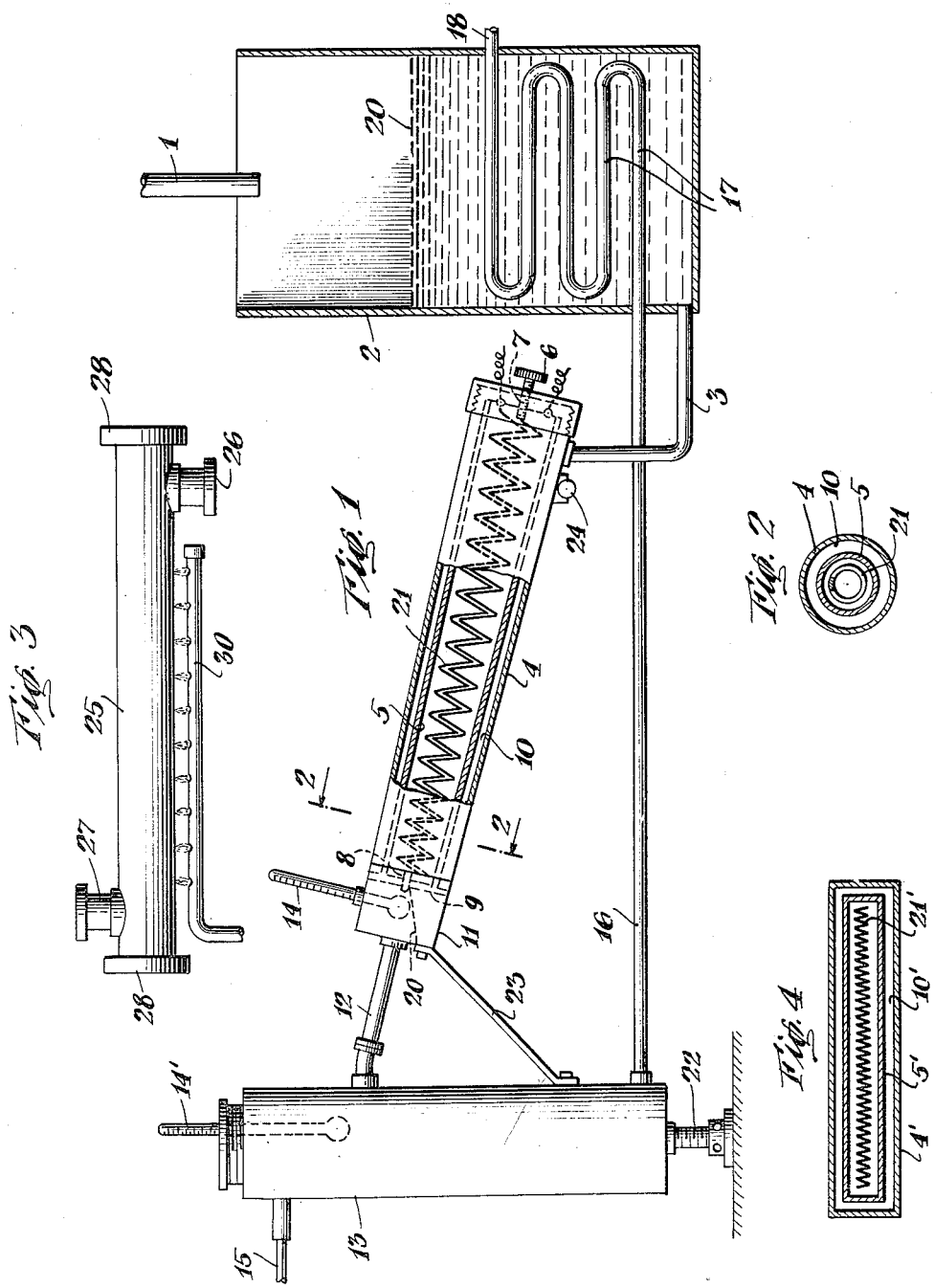
Ivor M. Colbeth, INVENTOR.
BY Charles W. Mortimer, ATTORNEY Patented Jan. 1, 1946

2,392,119

UNITED STATES PATENT OFFICE 2,392,119

PROCESS FOR DEHYDRATING OIL

Ivor M. Colbeth, East Orange, N. J., assignor to The Baker Castor Oil Company, Jersey City, N. J., a corporation of New Jersey Application July 11, 1941, Serial No. 401,905

11 Claims. (Cl. 260—405.5)

This invention relates to process for heat treatment of oils, particularly those that have constituents made up of chain series compounds containing hydroxyl groups. This is a continuation-in-part of my application Serial No. 220,454, filed July 21, 1938.

The hydroxyl groups in the compounds that are to be treated by this apparatus are connected to carbon atoms that are in turn connected to other carbon atoms to which hydrogen is connected. During the heat treatment hydroxyls unite with hydrogen to form water which is liberated and a double bond then unites the carbon atoms from which the OH group with the H, respectively, were split off.

This invention is particularly applicable to the dehydroxylation of castor oil by heat in the presence of a catalyst. It is well known that castor oil is composed largely of the glyceride of ricinoleic acid from which water can be removed by causing hydroxyl groups to unite with hydrogen, at an elevated temperature in the presence of a catalyst, thereby increasing the iodine value.

The dehydroxylation of castor oil may be accomplished by heating the same in the presence of a small amount, say 1% to 5%, of a dehydroxylating catalyst, among which may be mentioned oxidizing and non-oxidizing mineral acids such as sulfuric, persulfuric, sulfurous, manganic, permanganic, phosphoric, boric, and hydrochloric acid and their sodium and calcium salts, and oxides of metals and metalloids such as aluminum, nickel, iron, boron, titanium and silicon oxide, or easily decomposable esters such as sulfuric acid esters of methyl and butyl alcohol. The list of catalysts is not meant to be exhaustive but is illustrative of the sort that can be used in the dehydroxylation of castor oil.

In order to dehydroxylate the castor oil it is rapidly heated in the presence of the catalyst to a temperature at which elimination of water takes place. This temperature is usually about 220° C. to about 400° C., depending somewhat upon the particular catalyst used and the amount thereof that is employed. The dehydroxylation should be continued until the iodine value has increased considerably, and in many cases or for certain purposes it is desirable to have it about 140.

In order for the process to operate most satisfactorily for its intended purpose the heat should be applied to the castor oil while the oil is in a thin layer or layers so located that the evolved gases or vapors will readily escape from the body of the liquid without remaining therein more than a very short interval of time. This purpose is accomplished by so applying the heat that the evolved vapors or gases have only a very short distance to travel as they move upwardly through the oil before they reach the surface where they escape from the oil. This can be done very conveniently, for example, by passing the oil through a heater which causes the oil to move upwardly in a thin layer at an angle inclined to the horizon and applying the heat perpendicular to the surface of the oil on one or both sides of the layer of oil.

The invention will be understood from the description in connection with the accompanying drawing which shows apparatus by means of which the process can be practiced.

In the drawing:

Fig. 1 is a side view partly in section;

Fig. 2 is a section through the heater along the line 2—2 of Fig. 1;

Fig. 3 is a side view of a modification of a portion of the apparatus; and

Fig. 4 is a cross section through a modified heater.

In the drawing, reference character 1 indicates the exit end of a pipe that leads from a source or supply of castor oil, not shown. The oil flows from the pipe 1 into a tank 2 where it is preheated by waste heat from the process. The preheated oil passes from the tank 2 through the pipe 3 to a dehydrating system where the dehydration takes place exceedingly rapidly in a thin layer or sheet.

The process may be rapidly carried out in the apparatus shown in Fig. 1. It comprises an enlarged, inclined straight pipe or chamber 4, which is preferably made conically shaped for a purpose to be described. It is supported in any convenient way. The pipe 3 enters the chamber 4 near its lower end on the under side. A conically shaped heater 5 is installed in the chamber 4 so that it can be moved axially therein by a hand wheel 6 and screw 7 which supports one end of the heater in the chamber 4. The other end of this heater carries a rod 8 that passes through a hole in a cross bar 9 so that this end of the heater 5 is supported in the chamber 4 in such a manner that an annular space 10 of substantially uniform cross section is left between the outer surface of the heater 5 and the inner surface of the chamber 4. By turning the hand wheel 6, the size of this annular space 10 can be easily regulated quite accurately. It has been found to be desirable to have the thickness of this space about ⅛ to ¼ of an inch and its length about two to four feet.

A compartment 11 is provided at the upper end of the chamber 4 and a thermometer 14 extends into this compartment. A pipe 12 leads from the compartment 11 to the upper portion of a separating chamber 13 in the upper end of which a thermometer 14' is placed. This chamber 13 may be a tower or dephlegmator for causing bubbles to break and the liquid to separate from the gas. An outlet 15 for steam is provided at the upper end of the chamber 13 and a pipe 16 leads from the lower portion of this chamber 13 to the heat exchanger or coil 17 in the tank 2. An outlet pipe 18 leads from the coil 17 to a place of storage for the treated oil.

The liquid level in the tank 2 and chamber 4 is normally at about the line 20. The chamber 4 may however be adjusted to different angles of inclination and the liquid level therein and in the tank 2 can be changed to suit conditions.

A convenient way to change the inclination of the chamber 4 is to have a jack 22 under the lower end of the chamber 13 with a support for the upper end of the chamber 4 attached to the chamber 13 as somewhat diagrammatically shown at 23, so that when the chamber 13 is raised the upper end of the chamber 4 is likewise raised. The chamber 4 turns slightly on the support 24 and the pipe 3 is flexible enough not to be broken when the inclination of the chamber 4 is changed.

In the modification shown in Fig. 3, the chamber 25 corresponding to the chamber 4 is cylindrical. When it is used for carrying out the process the pipe 3 is connected to the inlet 26 and the pipe 12 to the outlet 27. Flanges 28 are provided at its ends to which caps are to be attached to close the chamber. In this modification the heaters for the inside are also made cylindrical and are supported at the middle of the chamber 25 so as to leave an annular space between them. Heaters of different diameters may be used for providing different sizes of the annular spaces through which the oil flows. The chambers 4 and 23 may also be heated externally in any convenient way, as for example by means of a flame from gas jets 30, when desired.

In the modification shown in Fig. 4 the chamber 4' corresponding to the chamber 4 is rectangular in cross section may be adjustably installed at an inclination as described above in connection with chamber 4. The heater 5' is also rectangular in shape in cross section and is preferably of such size and so located in the chamber 4' that the transverse dimension of the space 10' between the inside wall of the chamber 4' and the outside wall of the heater 4' through which the oil passes is substantially uniform all the way around.

The heaters 5 and 5' may be heated in any suitable way such as by means of electric heating coils 20 and 21', for example, or the electric heaters may be replaced by passing hot gases or products of combustion through them, preferably in an upward direction. Heat may also be applied to the outsides of chambers 4 and 4' in any convenient way. One of the important features of this invention is to have the heat applied to surfaces of thin layers or sheets of the oil and to have the portion of the apparatus where the heat is applied so shaped and arranged that the thin layer of liquid will move upwardly through a linear space that is free from curves or pockets where the oil might become caught and pocketed or delayed and subjected to heat treatment for too long a period of time, thus causing side reactions resulting in waste of oil and production of undesirable products.

The operation of the process is as follows:

When a solid catalyst or dehydrating agent is used it is provided in lumps or pellets and placed in the space 10 or 10' in the heating chamber so that the oil can pass through the interstices between the particles, or it is powdered and mixed with the oil in the tank 2 or placed at the upper end of the chamber 4. When a liquid catalyst or dehydrating agent is used it is mixed with the oil in the tank 2. Or the liquid or powdered catalyst can be injected into the oil while it is passing through the pipe 3 or just as it enters the chamber 4.

It has been found suitable to regulate the temperature of the incoming oil when castor oil is being dehydrated so that it is about 100° C. Due to the very thin layer of the oil the temperature of the oil rises very rapidly in the annular space 10 or space 10' and quickly reaches between 220° C. and 400° C.

The temperature becomes higher when the upper end of the chamber 4 is elevated more because of the higher head of liquid and consequent greater pressure thereby caused to exist on the boiling oil.

Sufficient dehydration of castor oil takes place in this process, in considerably less time than a minute, to cause its iodine value to become about 140. About 1% to 5% of catalyst is used calculated on the quantity of oil treated depending upon the particular catalyst used. Bubbles of oil filled with steam collect in the upper portion of the compartment 11 and are forced through the pipe 12 into the tower 13 where they break, the steam passing out through the pipe 15 and the dehydrated oil out through the pipe 16 into the coil 17 where it preheats the incoming oil.

Although the temperature in the chamber 4 can be changed considerably, and the thickness, diameter and length of the annular space 10 can be varied widely for different oils and different rates at which the oil is passed through the heated space, it has been found that very satisfactory results can be obtained for example by passing about three pounds of castor oil per minute through such an annular space one eighth of an inch thick and two feet long, inclined at an angle of about 30 degrees to the horizontal in the presence of 1% sulfuric acid as a catalyst at a temperature of about 275° C. and approximately atmospheric pressure at the upper end. The bubbles, constituting the foam that collects in the compartment 11 and passes out through the pipe 12 into the tower 13, break so that the steam that was inside of the bubbles is released and passes out through the outlet 15 with substantially no waste of the dehydrated oil.

What is claimed is:

1. The process of dehydroxylating glyceride oils, which comprises introducing the oil into the lower end of an inclined space of such shape that the oil is in a thin layer, and applying sufficient heat to the oil to vaporize it.

2. The process of claim 1, in which the space into which the oil is introduced is an annular space.

3. The process of claim 1, in which heat is applied from the inside of said space.

4. The process of claim 1, in which the space into which the oil is introduced is free from pockets.

5. The process of dehydroxylating glyceride oils, which comprises introducing the oil into the lower end of an inclined space of such shape that the oil is in a thin layer, and applying sufficient heat to both sides of the oil to vaporize it.

6. The process of dehydroxylating glyceride oils, which comprises introducing the oil into the lower end of an inclined space of such shape that the oil is in a thin layer, and applying sufficient heat to the oil to vaporize it while maintaining the liquid level of the oil in said space substantially constant.

7. The process of dehydroxylating glyceride oils, which comprises introducing the oil into the lower end of an inclined space of such shape that the oil is in a thin layer, and applying sufficient heat to the oil to vaporize it while maintaining the liquid level of the oil in said space substantially constant at a point below the upper end of said inclined space.

8. The process of dehydroxylating glyceride oils, which comprises introducing the oil into the lower end of an inclined space of such shape that the oil is in a thin layer, and applying sufficient heat to the oil to vaporize it while controlling the liquid level in said space by varying the inclination of said space.

9. The process of dehydroxylating glyceride oils, which comprises introducing the oil into the lower end of an inclined space of such shape that the oil is in a thin layer, applying sufficient heat to the oil to vaporize it, and varying the rapidity of heating the oil by varying the transverse dimension of said space.

10. The process of dehydroxylating glyceride oils, which comprises introducing the oil into the lower end of an inclined space of such shape that the oil is in a thin layer, applying sufficient heat to the oil to vaporize it, and utilizing heat in the treated oil to heat incoming oil.

11. The process of dehydroxylating glyceride oils, which comprises introducing the oil into the lower end of an inclined space of such shape that the oil is in a thin layer, applying sufficient heat to the oil to vaporize it, and conducting hot oil and vapor from said space into a separating chamber.

IVOR M. COLBETH.